(12) United States Patent
Miller et al.

(10) Patent No.: US 12,708,104 B2
(45) Date of Patent: Aug. 18, 2026

(54) COUPLER ORIENTATION SYSTEM

(71) Applicant: Harry Miller Co., LLC, Boston, MA (US)

(72) Inventors: Harry Miller, Boston, MA (US); Dodd H. Grande, Seattle, MA (US); Michael Frisch, Braintree, MA (US)

(73) Assignee: Harry Miller Co., LLC, Boston, MA (US)

( * ) Notice: Subject to any disclaimer, the term of this patent is extended or adjusted under 35 U.S.C. 154(b) by 129 days.

(21) Appl. No.: 18/760,010

(22) Filed: Jun. 30, 2024

(65) Prior Publication Data

US 2024/0349699 A1 Oct. 24, 2024

Related U.S. Application Data

(63) Continuation-in-part of application No. 17/351,106, filed on Jun. 17, 2021, now Pat. No. 12,127,635.

(60) Provisional application No. 63/557,430, filed on Feb. 23, 2024, provisional application No. 63/040,752, filed on Jun. 18, 2020.

(51) Int. Cl.
*F16B 45/00* (2006.01)
*A01K 27/00* (2006.01)

(52) U.S. Cl.
CPC .......... *A01K 27/001* (2013.01); *F16B 45/002* (2021.05)

(58) Field of Classification Search
CPC .. A01K 27/005; A01K 27/001; A01K 27/002; A01K 27/003; F16C 11/12; F16B 45/02; F16B 45/002
See application file for complete search history.

(56) References Cited

U.S. PATENT DOCUMENTS

| | | | | |
|---|---|---|---|---|
| 2,475,226 | A | 7/1949 | Ellis | |
| 3,623,194 | A | 11/1971 | Claeson et al. | |
| 4,174,553 | A * | 11/1979 | Schrougham | A44B 11/226 24/321 |
| 4,297,962 | A | 11/1981 | Johnson, Jr. | |
| 4,416,037 | A | 11/1983 | Panthöfer et al. | |
| 4,997,123 | A * | 3/1991 | Backus | F16D 3/005 29/896.9 |

(Continued)

FOREIGN PATENT DOCUMENTS

| | | |
|---|---|---|
| CN | 101782101 A | 7/2010 |
| CN | 102098937 A | 6/2011 |

(Continued)

OTHER PUBLICATIONS

International Search Report and Written Opinion dated Jun. 12, 2025 for corresponding PCT Application No. PCT/US2025/016724; p. 34.

(Continued)

*Primary Examiner* — Jack W Lavinder
(74) *Attorney, Agent, or Firm* — Lowe Graham Jones PLLC

(57) ABSTRACT

Embodiments are directed toward a coupler orientation system. In some embodiments, the coupler orientation system includes an orientation member that enables a coupler to pivot relative to a surface of a structure to which the coupler is fixed while resiliently orienting the coupler substantially orthogonal to the surface. Accordingly, the orientation member facilitates securing objects with a single hand.

17 Claims, 6 Drawing Sheets

(56) References Cited

U.S. PATENT DOCUMENTS 5,297,514 A * 3/1994 Stout .................... A01K 27/005 119/863
5,329,883 A 7/1994 White
5,752,299 A 5/1998 Vivacqua et al.
5,839,174 A 11/1998 Chamings
5,898,366 A 4/1999 Brown et al.
5,934,599 A 8/1999 Hammerslag
6,289,558 B1 9/2001 Hammerslag
6,381,815 B1 5/2002 Yamaguchi
6,499,437 B1 12/2002 Sorenson et al.
6,671,933 B1 1/2004 Friend et al.
7,145,425 B2 12/2006 Clement
7,591,050 B2 9/2009 Hammerslag
7,950,112 B2 5/2011 Hammerslag et al.
7,954,204 B2 6/2011 Hammerslag et al.
7,992,261 B2 8/2011 Hammerslag et al.
8,042,235 B2 10/2011 Wu
8,277,401 B2 10/2012 Hammerslag et al.
8,368,494 B2 2/2013 Fiedler
8,381,362 B2 2/2013 Hammerslag et al.
8,424,168 B2 4/2013 Soderberg et al.
8,468,657 B2 6/2013 Soderberg et al.
8,474,108 B2 7/2013 Eisenberger
8,516,662 B2 8/2013 Goodman et al.
D691,879 S 10/2013 Bernard
8,713,820 B2 5/2014 Kerns et al.
8,727,073 B2 5/2014 Lang
8,739,371 B2 6/2014 Fiedler
8,794,682 B2 8/2014 Fiedler
8,984,719 B2 3/2015 Soderberg et al.
9,038,251 B1 5/2015 Bevilacqua
9,101,181 B2 8/2015 Soderberg et al.
9,125,455 B2 9/2015 Kerns et al.
9,138,030 B2 9/2015 Soderberg et al.
9,149,089 B2 10/2015 Cotterman et al.
9,179,729 B2 11/2015 Cotterman et al.
9,248,040 B2 2/2016 Soderberg et al.
9,259,056 B2 2/2016 Soderberg et al.
9,261,726 B2 2/2016 Shi et al.
D751,281 S 3/2016 Nickel et al.
D755,496 S 5/2016 Tulowitzki et al.
9,339,082 B2 5/2016 Hammerslag et al.
D758,061 S 6/2016 Whewell
9,375,053 B2 6/2016 Burns et al.
9,408,437 B2 8/2016 Goodman et al.
D767,269 S 9/2016 Lovett et al.
9,439,477 B2 9/2016 Neiley
9,486,039 B2 11/2016 Ha
9,516,923 B2 12/2016 Capra et al.
D776,421 S 1/2017 Venturini
9,532,626 B2 1/2017 Lovett et al.
9,581,292 B2 2/2017 Kremer et al.
9,610,185 B2 4/2017 Capra et al.
9,629,417 B2 4/2017 Cavanagh et al.
9,680,131 B2 6/2017 Huangfu et al.
9,681,705 B2 6/2017 Trudel et al.
9,700,101 B2 7/2017 Lovett et al.
9,706,814 B2 7/2017 Converse et al.
D794,316 S 8/2017 Tulowitzki et al.
9,737,115 B2 8/2017 Soderberg et al.
9,743,714 B2 8/2017 Hammerslag et al.
9,770,070 B2 9/2017 Cotterman et al.
9,770,955 B2 9/2017 Su
9,771,159 B1 9/2017 Grenga
D799,810 S 10/2017 Mayberry
9,797,432 B2 10/2017 Inkavesvaanit
9,854,873 B2 1/2018 Kerns et al.
9,867,430 B2 1/2018 Hammerslag et al.
9,872,568 B2 1/2018 Capra et al.
9,872,790 B2 1/2018 Capra et al.
9,918,865 B2 3/2018 Nickel et al.
10,004,297 B2 6/2018 Lovett
10,039,348 B2 8/2018 Cavanagh et al.
10,070,695 B2 9/2018 Burns et al.
10,076,160 B2 9/2018 Burns et al.
10,085,517 B2 10/2018 Beers et al.
10,123,589 B2 11/2018 Soderberg et al.
D835,898 S 12/2018 Lovett
D835,976 S 12/2018 Nickel et al.
10,173,085 B2 1/2019 Dehondt
10,174,784 B1 1/2019 Cornay
11,044,970 B1 6/2021 Chan et al.
11,510,396 B1 * 11/2022 Price .................... A01K 27/005
11,564,457 B1 1/2023 Wu
2003/0101553 A1 6/2003 Itoigawa et al.
2005/0067222 A1 * 3/2005 Casebolt ............ A62B 35/0037 182/30
2005/0082114 A1 * 4/2005 Casebolt ............ A62B 35/0037 182/3
2005/0139739 A1 6/2005 Hamerski
2006/0032461 A1 * 2/2006 Sporn .................. A01K 27/003 119/797
2007/0084026 A1 4/2007 Muromachi
2007/0099469 A1 5/2007 Sorensen
2007/0204442 A1 9/2007 Falb et al.
2010/0294213 A1 * 11/2010 Vaccari ................ A01K 27/005 119/863
2011/0138583 A1 6/2011 Fiedler
2011/0298227 A1 12/2011 Fiedler
2012/0124786 A1 5/2012 Fiedler
2012/0216757 A1 * 8/2012 Davis, Jr. ............. A01K 27/001 119/863
2013/0221173 A1 8/2013 Glover
2014/0250639 A1 9/2014 Siwak
2014/0298630 A1 10/2014 Hortnagl
2015/0136041 A1 * 5/2015 Perrucci ................. A01K 27/00 119/799
2018/0094466 A1 4/2018 Schneider et al.
2018/0160775 A1 6/2018 Pollack et al.
2018/0249682 A1 9/2018 Brian
2018/0310671 A1 11/2018 Soderberg et al.
2018/0363328 A1 12/2018 Huang
2019/0021447 A1 1/2019 Whewell et al.
2019/0024698 A1 1/2019 Berndorfer et al.
2019/0343087 A1 * 11/2019 White .................. A01K 27/005
2020/0022463 A1 1/2020 Templeton
2021/0037792 A1 2/2021 Glozbach De Cabarrus et al.
2021/0127640 A1 * 5/2021 Tarbutton ............. A01K 15/021
2022/0015484 A1 1/2022 Pagano et al.
2022/0295948 A1 9/2022 Chui et al.
2022/0349431 A1 11/2022 Haider et al.
2023/0000214 A1 1/2023 Laszkiewicz
2023/0061741 A1 3/2023 Mullin et al.
2023/0301275 A1 * 9/2023 Douglas ............... A01K 27/006
2024/0299784 A1 * 9/2024 Carroccia .............. A62B 35/04

FOREIGN PATENT DOCUMENTS

DE 202005000048 3/2005
DE 202011052397 U1 3/2012
DE 102010044144 B3 5/2012
DE 102016122879 A1 5/2018
EP 2389084 B1 5/2017
FR 2830264 B1 10/2005
FR 2972361 A1 9/2012
JP 2001221375 A 8/2001
JP 2007068828 A 3/2007
JP 2018130940 A 8/2018
KR 20170055454 A 5/2017
KR 102036738 B1 10/2019
KR 20230034518 A 3/2023
WO 2012036813 A1 3/2012
WO 2012152911 A1 11/2012
WO 2016029844 A1 3/2016
WO 2018039584 A1 3/2018
WO 2019192930 A1 10/2019

OTHER PUBLICATIONS

The Home Depot; Lokk Latch; Black Polymer and Stainless Steel Two-way Magnetic Self-latching Fence Gate Latch 50110; Aug. 8, 2019; 4 pages.

(56) References Cited

OTHER PUBLICATIONS

International Search Report and Written Opinion dated Oct. 22, 2021 for co-pending International Application No. PCT/US2021/037950; 13 pages.

* cited by examiner

COUPLER ORIENTATION SYSTEM

CROSS-REFERENCE TO RELATED APPLICATIONS

This non-provisional application claims the benefit of the provisional application having Ser. No. 63/557,430, filed Feb. 23, 2024, titled COUPLER ORIENTATION MEMBER, and is a continuation-in-part of the co-pending non-provisional application having Ser. No. 17/351,106, filed on Jun. 17, 2021, titled MAGNETICALLY GUIDED LATCH, which claims the benefit of the provisional application having Ser. No. 63/040,752, filed on Jun. 18, 2020, titled MAGNETICALLY GUIDED RING LATCH, the entirety of each of which is incorporated herein by reference.

TECHNICAL FIELD

The invention relates to orientation systems and, more particularly, to coupler orientation systems.

BACKGROUND OF THE INVENTION

Latches are generally configured to secure couplers to be retained by the latch and are used in a variety of applications, such as dog leashes or helmet chin straps. Such latches generally require two hands to secure the coupler in the latch. For example, a first hand grasps the latch and opens it, a second hand grasps the coupler and inserts it into the latch while the first hand maintains the latch in the open configuration, and after the coupler is fully received in the latch, the first hand transitions the latch to a closed configuration to thereby secure the coupler in the latch. Korean Patent No. KR102036738, titled PET NECK BAND WITH REINFORCING PLATE and issued to Keun, teaches the approach of a pet band equipped with a reinforcing bar, which is a metal plate with an elastic contact portion compressed downward by the pet band so that the elastic contact portion makes close contact with a pet lead ring. This arrangement prevents the ring from being moved from its position or orientation in which it extends away from the pet band. In many environments, couplers are designed to lay flat under the force of gravity against the surface of the structure to which they are attached to prevent unintentional contact with the coupler that may cause damage or injury. Accordingly, such arrangement is not only relatively complex to install or implement and relatively expensive owing to the material and structure, but it also poses safety concerns.

Accordingly, there is a need for easily securing couplers with a single hand. There is also a need to do so in a safe manner that prevents damage or injury caused by unintentional contact with the coupler. There is a further need to provide a solution to such problems that is easy to implement. There is also a need for an inexpensive solution to such issues.

BRIEF SUMMARY OF THE INVENTION

It is therefore an object of the present invention to provide orientation systems that facilitate using couplers to secure objects with a single hand.

It is also an object of the present invention to provide orientation systems that achieve the above object and that prevent damage or injury caused by unintentional contact with the coupler.

It is another object of the present invention to provide orientation systems that achieve the above objects and that are easy to implement.

It is a further object of the present invention to provide orientation systems that achieve the above objects and that are inexpensive.

The invention achieves the above objects as well as other objects and advantages that will become apparent from the description that follows by providing a coupler orientation system. In some embodiments, the coupler orientation system includes an orientation member disposed near a surface of a structure. The orientation member is configured to elastically orient a coupler substantially perpendicular to the surface of the structure while allowing the coupler to pivot relative to the surface. Accordingly, the orientation member facilitates securing objects with a single hand.

In some embodiments, the orientation member enables the coupler to pivot to close to parallel to the structure surface or substantially perpendicular to the default orientation of the coupler toward which the orientation member biases the coupler. In some embodiments, the orientation member biases the coupler toward an orientation that is substantially perpendicular to a tangent of the structure surface. The coupler's pivot axis, in some embodiments, is substantially perpendicular to the tangent or substantially parallel to the coupler's radius or diameter and a dimension of the structure surface, such as a dimension that is substantially perpendicular to the tangent. In some embodiments, the coupler pivots about the orientation member.

The orientation member in some embodiments extends to portions of the coupler that are on opposite sides of the structure or structure surface from each other. In some embodiments, the coupler includes a ring, such as a D-ring or a C-ring, or has a shank, and the orientation member extends around at least close to 180° of the shank. The orientation member in some embodiments has two resilient or elastic portions, such as arms disposed on opposite sides of the shank, that respectively resiliently or elastically deform responsive to the coupler pivoting in a direction that corresponds to the respective resilient or elastic portions. In such embodiments, those directions are substantially opposite to each other, and at least when deformed, the respective resilient or elastic portions urge the coupler to return to its default orientation substantially perpendicular to the structure surface.

In some embodiments, a layer of material defines the structure surface, and the orientation member is disposed between the coupler and the structure surface or the first layer. The orientation member is, in some embodiments, disposed between the first and second layers of the structure's material.

The orientation member in some embodiments includes a sheet of resilient material. In some embodiments, the sheet defines a notch that receives a portion of the coupler, such as with two resilient or elastic portions of the sheet being disposed on opposite sides of such portion of the coupler.

In some embodiments, the structure is a collar or harness, such as a pet collar or harness. The orientation member in some embodiments enables the structure surface to bend about the coupler.

BRIEF DESCRIPTION OF THE DRAWINGS

The preferred embodiments of the present invention are described in detail below with reference to the following drawings.

DETAILED DESCRIPTION OF THE PREFERRED EMBODIMENTS

A coupler orientation system in accordance with the principles of the invention is generally indicated at reference number 22 in the figures of the attached drawings, wherein numbered elements in the figures correspond to like-numbered elements herein.

Figure 1:
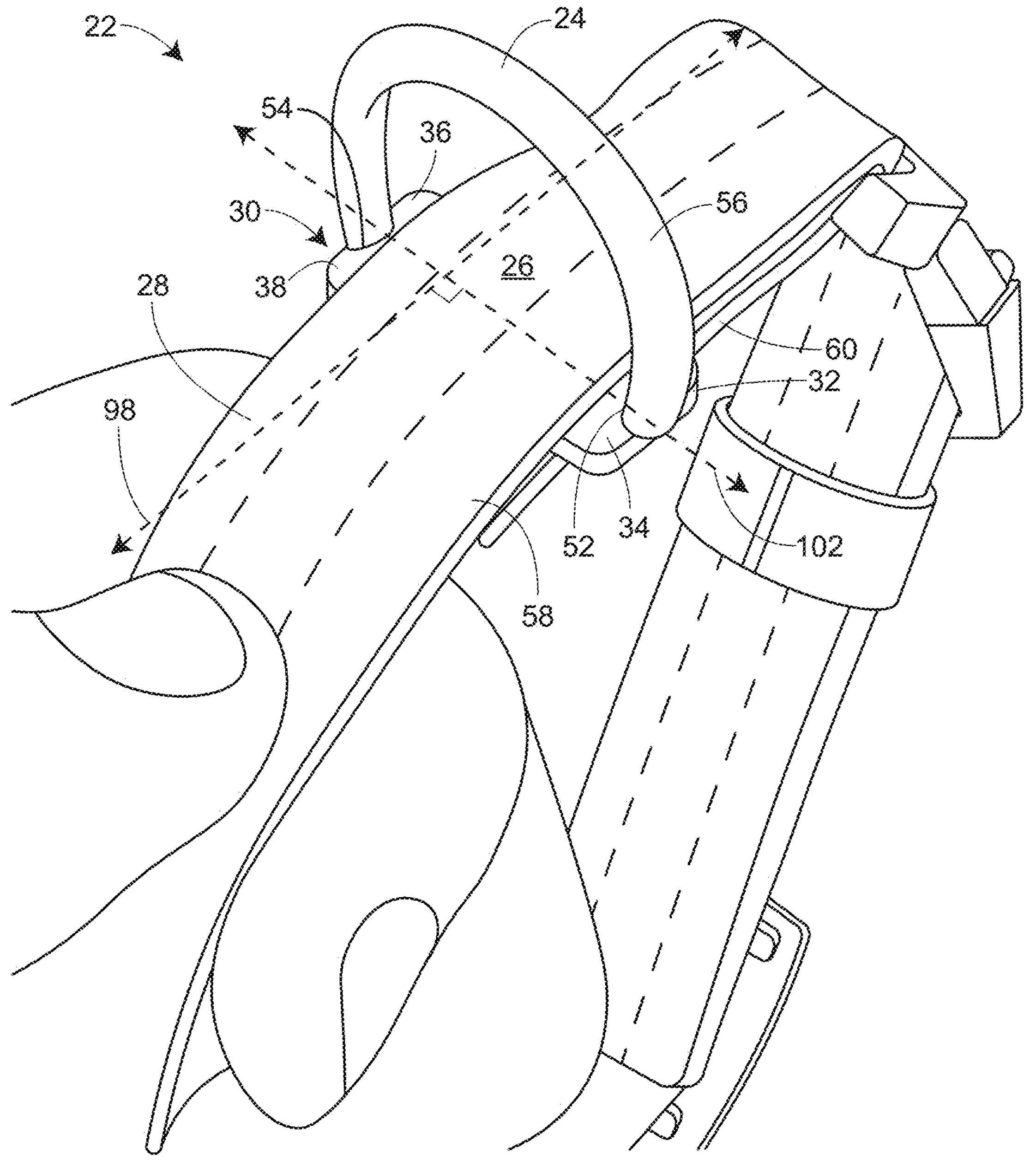
FIG. 1 is a perspective view of a coupler orientation system in accordance with the principles of the present invention.
Figure 2:
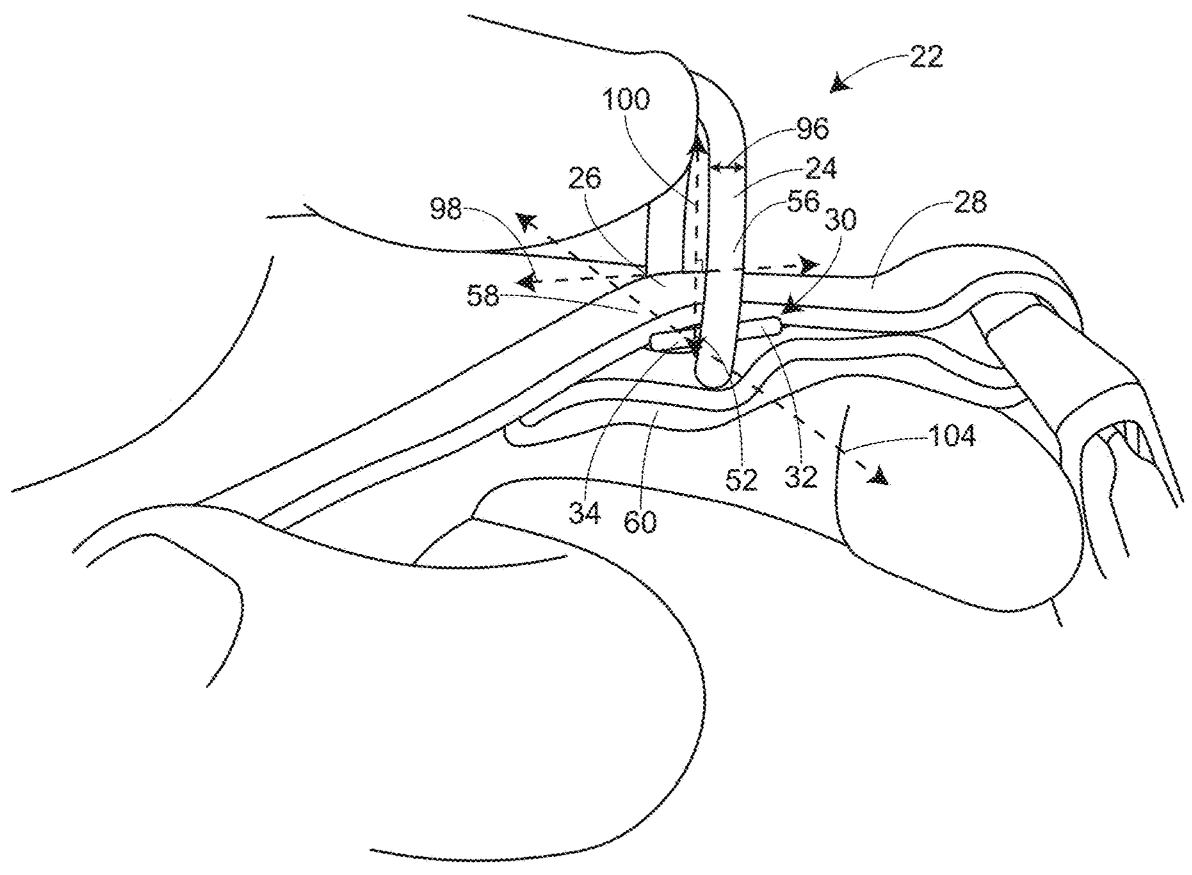
FIG. 2 is a side-elevational view of the coupler orientation system of FIG. 1 with a coupler disposed in its default position.

As shown in FIG. 1, the coupler orientation system 22 is configured to resiliently or elastically orient a coupler, such as the D-ring or C-ring 24, at an orientation relative to a structure surface, such as the outer surface 26 of the pet collar or harness 28. Such orientation facilitates using the coupler with a single hand. In some embodiments, use of the coupler 24 includes receiving and releasably latching the coupler 24 as a latchable member by a latch, such as the latch disclosed in U.S. application Ser. No. 17/351,106. The system 22 facilitates using the coupler 24 with a single hand by resiliently orienting the coupler 24 substantially orthogonal (or at least somewhat transverse) to the structure surface 26, as shown in FIG. 2. Accordingly, as shown in FIG. 3, the system 22 enables the coupler 24 to deflect from the default position shown in FIG. 2 and then resiliently return to the default orientation shown in FIG. 2.

Figure 3:
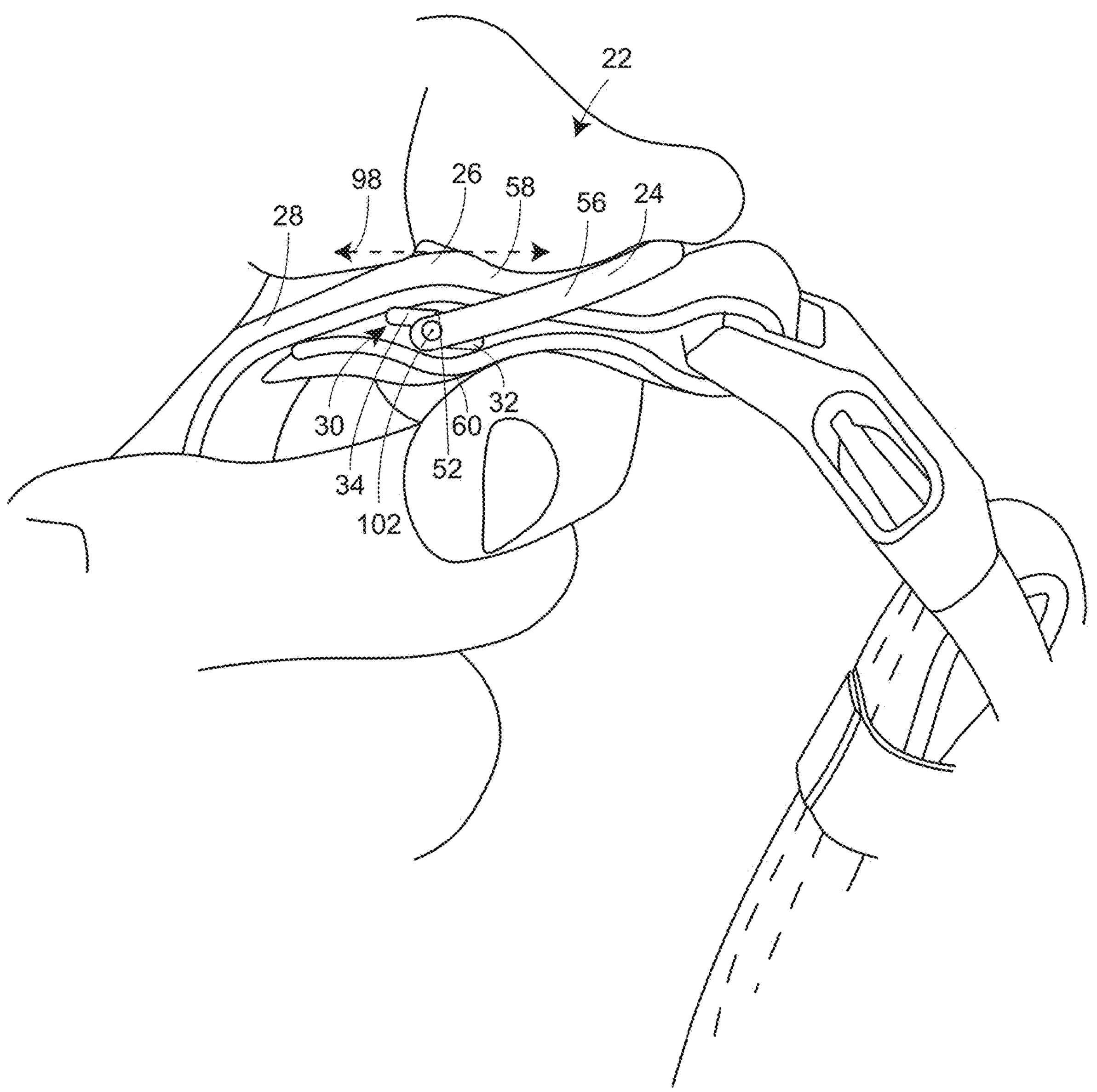
FIG. 3 is a side-elevational view of the coupler orientation system of FIG. 1 with the coupler disposed in a deflected position.
Figure 4:
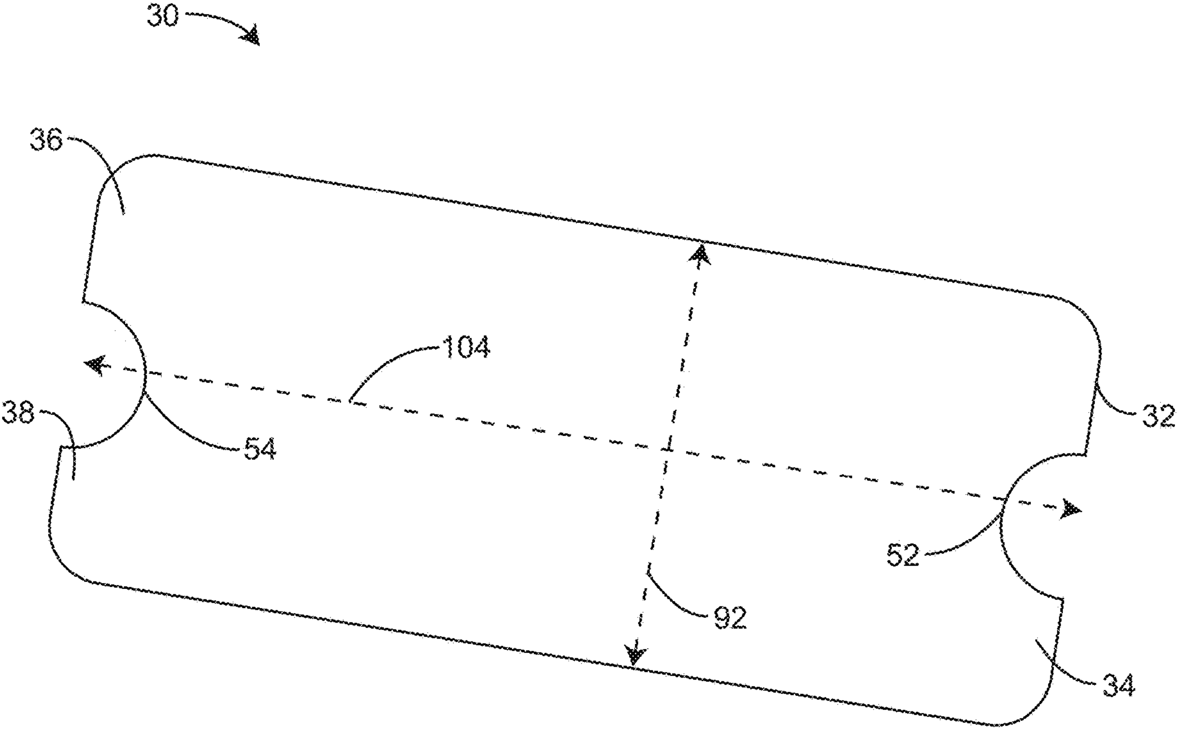
FIG. 4 is a top view of an orientation member of the coupler orientation system of FIG. 1.

In particular, the system 22 has an orientation member, such as member 30 shown in FIG. 4, that resiliently orients the coupler 24 substantially orthogonal to the structure surface 26 as shown in FIG. 3 while enabling the coupler 24 to pivot relative to the surface 26 as shown in FIG. 2. The member 30 functions to bias the coupler 24 at least somewhat transverse to the surface 26 so a convenient gap is created between the surface and the coupler. This allows a gap between the coupler and the surface such that a latch can be easily secured to the coupler, potentially with one hand.

Contrasting FIG. 2 with FIG. 3 illustrates that, in some embodiments, at least a portion of the orientation member 30, such as the arm 32, deflects when the coupler 24 pivots away from the default orientation in FIG. 3. The arm 32 is resilient or elastic. Accordingly, when the force that deflected the coupler 24 is removed, the arm 32 returns from the deflected orientation in FIG. 3 (e.g., substantially parallel to the structure surface 26 or substantially orthogonal to the default orientation of the coupler 24) to its default position in FIG. 2, thereby returning the coupler 24 to its default orientation in FIG. 2. As a result, the orientation system 22 prevents discomfort, damage, or injury caused by unintentional contact or impact with the coupler 24 by allowing the coupler 24 to deflect or pivot in response to force applied to the coupler 24 that exceeds the resilient force applied by the orientation member 30 that urges the coupler 24 toward its default orientation.

As shown in FIG. 4, the orientation member 30 has another arm 34 disposed opposite to the coupler from the first arm 32 and is configured to resiliently or elastically deform in the same manner as described above with respect to the arm 32 when the coupler 24 pivots in the direction opposite to the pivot direction shown in FIG. 3. Accordingly, the orientation system 22 enables the coupler 24 to pivot away from its default orientation shown in FIG. 2 in the direction opposite to the pivot direction shown in FIG. 3, and the second arm 34 urges the coupler 24 to return to its default orientation when the force that pivoted the coupler 24 is removed. In some embodiments, the orientation member 30 enables the coupler 24 to pivot toward the second arm 34 so that the coupler 24 is substantially parallel to the structure surface 26 or substantially orthogonal to its default orientation (i.e., opposite to that shown in FIG. 3).

In some applications, it is beneficial to increase the resilient biasing force by the orientation member 30 on the coupler 24 toward the default orientation of the coupler 24 shown in FIG. 2. In some embodiments, the orientation member includes only two resiliently or elastically deflecting portions on opposite sides of the coupler 24 (e.g., the first and second arms 32, 34). As shown in FIG. 4, however, the orientation member 30 has a second pair of resiliently deflecting arms 36, 38 that are disposed opposite to the arms 32, 34 and configured in the same manner as described above regarding the arms 32, 34. Accordingly, the orientation member 30 defines a notch 52 that is configured to receive one portion of the coupler 24 between the arms 32, 34 and another notch 54 configured to receive another portion of the coupler 24 between the arms 36, 38.

As shown in FIG. 1, the portion of the orientation member 30 that defines the notch 52 is therefore configured to contact one portion of the coupler 24 on a first side of the structure surface 26 while the portion of the orientation member 30 that defines the notch 52 contacts another portion of the coupler 24 on the opposite side of the structure surface 26, thereby applying double the resilient bias force to the coupler 24 when it pivots away from its default orientation shown in FIG. 2 compared to an arrangement in which the orientation member has only two resiliently deflecting portions in contact with the coupler 24.

As shown in FIG. 4, the orientation member 30 includes a sheet of resilient or elastic material, such as plastic or polyethylene. As shown in FIG. 1, the coupler 24 has a shank 56, and each pair of resilient arms 32, 34 and 36, 38, respectively, extend around substantially 180° of their respective portions of the shank 56 that are received in the respective notches 52, 54. Accordingly, the orientation member 30 is easy to install or implement as the orientation system 22 and provides an inexpensive solution to the problem described herein, at least compared to Keun's approach.

As shown in FIG. 2, structure 28 has two layers 58, 60 of material in the vicinity of the coupler 24. The orientation member 30 is disposed between the coupler 24 and the structure surface 26 or the first layer 58. Accordingly, in some embodiments, the orientation member 30 is retained in the structure 28 by an interference fit with the coupler 24 in the notches 52, 54 while the coupler 24 resides between the layers 58, 60. In other embodiments, the coupler is disposed between the orientation member and the structure surface with, in some embodiments, the orientation member fixed to the structure surface (e.g., adhered or stitched), thereby retaining the coupler.

Figure 5:
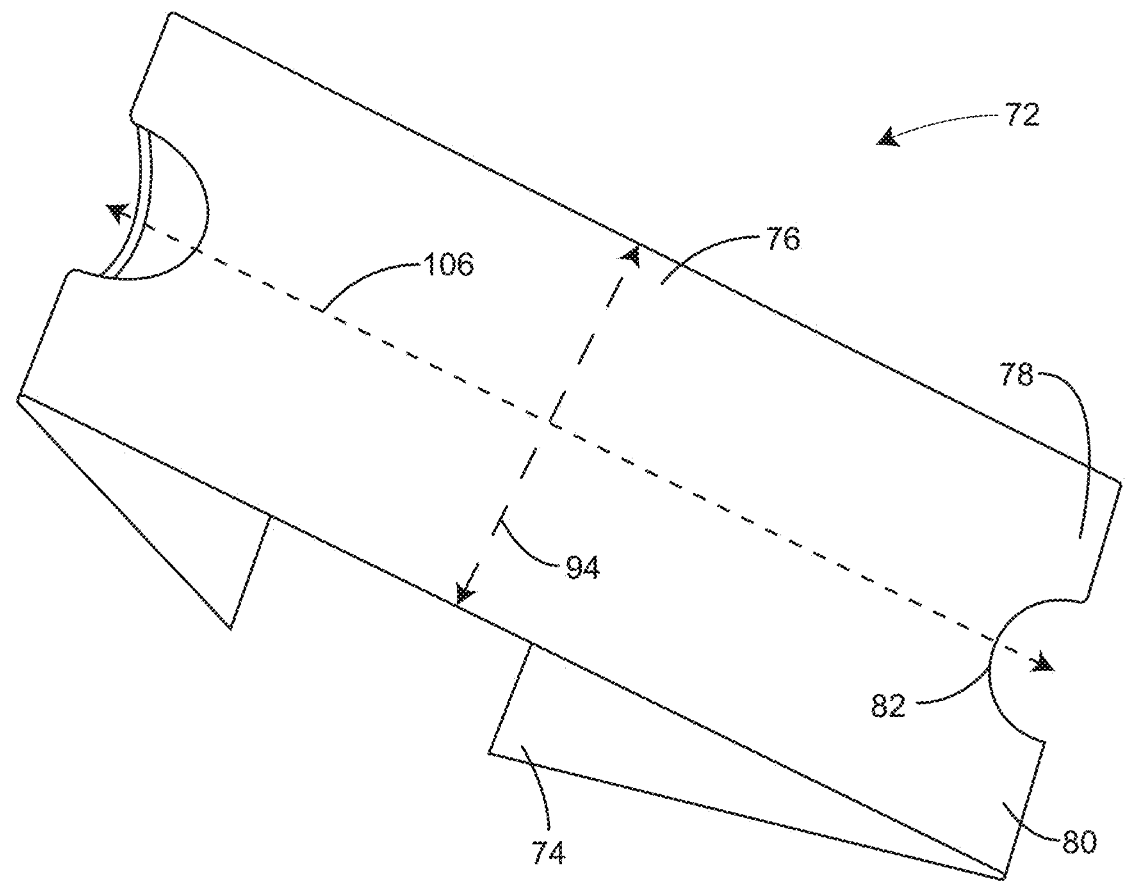
FIG. 5 is a perspective view of another embodiment of an orientation member that may be implemented as part of the coupler orientation system of FIG. 1 instead of the orientation member of FIG. 4.

FIG. 5 shows an orientation member 72 that is another embodiment of an orientation member configured to be implemented in the coupler orientation system 22 in place of the orientation member 30. The orientation member 72 is practically the same as the orientation member 30, except the orientation member 72 provides an increased resilient bias force to the coupler 24 that urges the coupler to return to its default orientation shown in FIG. 2. In particular, the orientation member 72 has a second layer 74 of the resilient material that folds under the upper sheet 76 of such material at the arms 78, 80. The orientation member 72 also defines a notch 82 between the arms 78, 80 where the orientation member 72 defines a substantially circular hole with a diameter that extends along the fold. Accordingly, the thickness of the resilient material in the region of the arms 78, 80 is double the thickness of the upper sheet 76. The opposite end portion of the orientation member 76 substantially mirrors its end portion described with respect to the arms 78, 80.

As shown in FIGS. 4 and 5, the orientation members 30 and 72 each have respective widths 92, 94 that are, in some embodiments, no larger than approximately three times the thickness or diameter 96 of the shank 56, as shown in FIG. 2. Accordingly, in addition to the pliability of the material of the orientation members 30, 72, the dimensions of the orientation members 30, 72 facilitate the structure surface 26 bending about the straight portion of the coupler 24 disposed between the layers 58, 60 of material. Another way to increase the resilience force applied to the coupler 24 by the orientation system 22 is to implement multiple orientation members stacked on top of each other, that in some embodiments includes multiple orientation members of the style described with respect to orientation member 30, orientation member 72, or a combination of both.

The embodiments of the orientation system 22 having the orientation members 30 or 72 have been described with respect to the structure surface 26 being defined by a middle portion of the structure 28. Where the structure 28 defines a substantially curved surface 26, such as in the case of a pet collar, the default orientation of the coupler 24 as shown in FIG. 2 causes the coupler 24 to extend substantially orthogonal to the tangent 96 of the structure surface 26 at the location of the coupler 24. Accordingly, as shown in FIG. 2, while the tangent 98 is substantially horizontal and the coupler 24 is oriented in its default orientation, the diameter 100 of the coupler 24 that extends the highest above the tangent 98 is substantially orthogonal to the tangent 98.

In some embodiments, the orientation members 30, 72 enable the coupler 24 to deflect to an orientation in which the diameter 100 is substantially parallel to the tangent 98 of the structure surface 26 (e.g., closer to parallel than perpendicular), as shown in FIG. 3. As shown in FIGS. 1-3, the orientation members 30, 72 facilitate the coupler 24 pivoting about a pivot axis 102 that is substantially perpendicular to the tangent 98 and the diameter 100 and substantially parallel to the diameter of the coupler 24 along the straight portion (not fully shown) of the D-ring or C-ring and the respective major axis 104 or of the orientation member 30 or 72 (see FIGS. 4 and 5).

Figure 6:
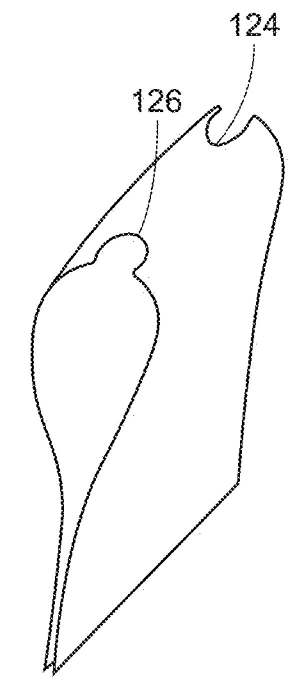
FIG. 6 is a perspective view of another embodiment of an orientation member.
Figure 7:
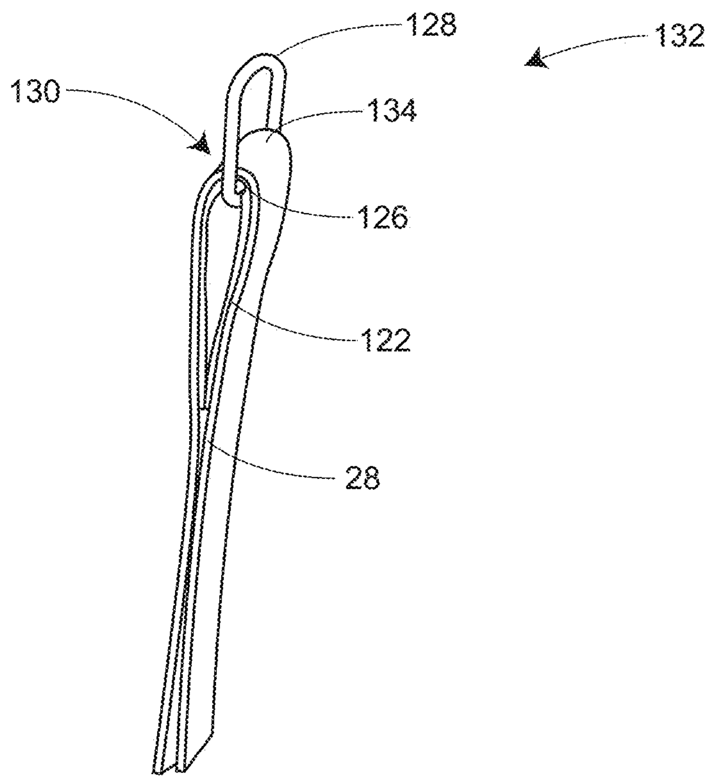
FIG. 7 is a perspective view of another embodiment of a coupler orientation system that implements the orientation member of FIG. 6 according to the principles of the invention.

In other embodiments, the major axis of the orientation member is not parallel to the coupler's pivot axis, or the structure surface 26 is not defined by a middle portion of the structure 28. As shown in FIG. 6, a coupler orientation system may implement the orientation member 122, which defines two notches 124, 126 that are configured to receive a coupler 128 disposed at a tag end portion or distal end portion 130 of the structure 28, as shown in FIG. 7. Accordingly, the coupler orientation system 132 shown in FIG. 7 is configured to operate relative to the structure surface 134 at the end portion 130 of the structure 28 in practically the same manner as discussed above with respect to the orientation members 30, 72 or the coupler orientation system 22.

In particular, the orientation member 122 is configured to resiliently bias the coupler 128 to be substantially orthogonal to the surface 134 or its tangent (not shown) at the location of the coupler 128. When the distal end portion 130 of the structure 28 is taut or otherwise substantially straight along its length as shown in FIG. 7, the orientation member 122 is configured to resiliently bias the coupler 128 to be oriented substantially parallel to the length of such portion of the structure 28 as shown in FIG. 7. Accordingly, the orientation systems disclosed herein may be implemented with respect to many different applications including helmet chin straps, backpack straps, or others, whether the coupler is a ring or another type that typically requires two hands to secure it to another mechanism such as a latch or buckle.

The term "configured" as used herein means an element being one or more of sized, dimensioned, positioned, or oriented to achieve or provide the recited function or result. The term "directly coupled" as used herein means that a component contacts (for example, when bolted) or is welded to another component. The term "indirectly coupled" as used herein means that a first component is coupled to a second component by way of one or more intervening components that are directly coupled to the first and second components. A first component that is indirectly coupled to a second component is directly coupled to a third component, which may be directly coupled to the second component or to a fourth component that is directly coupled to the second component. The term "coupled" should therefore be understood to disclose both direct and indirect coupling of components or elements that are described as being coupled to each other.

The term "substantially parallel" refers to parallel or within 5, 10, 15, or 20 degrees of parallel. The term "substantially orthogonal" refers to orthogonal or within 5, 10, 15, or 20 degrees of orthogonal. The term "substantially horizontal" or "substantially horizontally" refers to horizontal or within 5, 10, 15, 20, 25, or 30 degrees of horizontal. The term "substantially vertical" or "substantially vertically" refers to vertical or within 5, 10, 15, 20, 25, or 30 degrees of vertical. The term "approximately" or "substantially" refers to within 1, 5, 10, 15, 20, 25, 30, 40, or 50 percent of the identified value or range.

The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: (i) one or more As; (ii) one or more Bs; (iii) one or more Cs; (iv) one or more As and one or more Bs; (v) one or more As and one or more Cs; (vi) one or more Bs and one or more Cs; and (vii) one or more As, one or more Bs, and one or more Cs. The term "based on" as used herein is not exclusive and allows for additional base factors not described. The articles "a," "an," and "the" include plural references. Plural references are intended to also disclose the singular.

Although the invention's preferred embodiments have been illustrated and described above, many changes can be made without departing from the invention's spirit and scope. Each disclosure of a component preferably having a feature or characteristic is intended to also disclose the component as being devoid of that feature or characteristic, unless the invention's principles clearly dictate otherwise. Accordingly, the invention's scope is not limited by the disclosure of the preferred embodiments. Instead, the invention should be determined entirely by reference to the claims that follow. It should also be noted that the claim dependencies or combinations of elements recited in the claims do not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (such as "The apparatus or method of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

Those of ordinary skill in the art will conceive of the invention's other alternate embodiments upon reviewing this disclosure. Thus, the invention is not to be limited to the above description but is to be determined in scope by the claims that follow.

We claim:

1. A coupler orientation system comprising:

an orientation member configured to be disposed approximate a structure surface and to resiliently orient a coupler transverse to the structure surface while enabling the coupler to pivot relative to the structure surface, wherein the orientation member includes a sheet of resilient material, the sheet defining a notch configured to receive a portion of the coupler, whereby the orientation member resiliently orienting the coupler facilitates securing objects.

2. The coupler orientation system of claim 1, wherein the orientation member is configured to enable the coupler to pivot to substantially parallel to the structure surface.

3. The coupler orientation system of claim 1, wherein the coupler is biased to be oriented substantially orthogonal to the structure surface thus defining a first orientation of the coupler, and the orientation member is configured to enable the coupler to pivot to a second orientation that is substantially orthogonal to the first orientation.

4. The coupler orientation system of claim 1, wherein the coupler oriented substantially orthogonal to the structure surface defines a first orientation of the coupler that is substantially orthogonal to a tangent of the structure surface where the coupler is disposed, and the orientation member is configured to enable the coupler to pivot to a second orientation that is substantially orthogonal to the first orientation.

5. The coupler orientation system of claim 1, wherein the orientation member is configured to enable the coupler to pivot about an axis that is substantially perpendicular to a tangent of the structure surface.

6. The coupler orientation system of claim 1, wherein the coupler defines a pivot axis substantially parallel to the structure surface, and the orientation member is configured to enable the coupler to pivot about the pivot axis.

7. The coupler orientation system of claim 1, wherein the coupler includes a D-ring or a C-ring.

8. The coupler orientation system of claim 1, wherein the structure surface is defined by a collar or harness.

9. The coupler orientation system of claim 1, wherein the orientation member does not prevent bending the structure surface about the coupler.

10. A coupler orientation system comprising:

an orientation member configured to be disposed approximate a structure surface and to resiliently orient a coupler transverse to the structure surface while enabling the coupler to pivot relative to the structure surface, wherein the orientation member is configured to contact two portions of the coupler that are opposite the structure surface from each other and is configured to enable the coupler to pivot about the orientation member.

11. The coupler orientation system of claim 1, wherein the coupler includes a ring, and the orientation member is configured to enable the ring to pivot to substantially parallel to the structure surface.

12. The coupler orientation system of claim 1, wherein the coupler has a shank, and the orientation member extends around at least substantially 180° of the shank of the coupler.

13. The coupler orientation system of claim 1, wherein the coupler has a shank, and the orientation member has two resilient arms disposed on opposite sides of the shank of the coupler.

14. The coupler orientation system of claim 1, wherein the coupler has two resilient portions, wherein one of the resilient portions is configured to resiliently deform responsive to the coupler pivoting in a first direction and to urge the coupler to return to being oriented substantially orthogonal to the structure surface, and wherein another of the resilient portions is configured to resiliently deform responsive to the coupler pivoting in a second direction and to urge the coupler to return to being oriented substantially orthogonal to the structure surface, the second direction being substantially opposite the first direction.

15. A coupler orientation system comprising:

an orientation member configured to be disposed approximate a structure surface and to resiliently orient a coupler transverse to the structure surface while enabling the coupler to pivot relative to the structure surface, the orientation member biasing a portion of the coupler away from the structure surface, creating a gap between the portion of the coupler and the structure surface;

a layer of material that defines the structure surface; and the coupler, wherein the orientation member is disposed between the structure surface and a portion of the coupler.

16. A coupler orientation system comprising:

an orientation member configured to be disposed approximate a structure surface and to resiliently orient a coupler transverse to the structure surface while enabling the coupler to pivot relative to the structure surface, the orientation member biasing a portion of the coupler away from the structure surface, creating a gap between the portion of the coupler and the structure surface;

a first layer of material that defines the structure surface;

a second layer of material; and the coupler, wherein the coupler is disposed between the first and second layers, and wherein the orientation member is disposed between the first and second layers and between the first layer and the coupler.

17. A coupler orientation system comprising:

an orientation member configured to be disposed approximate a structure surface and to resiliently orient a coupler transverse to the structure surface while enabling the coupler to pivot relative to the structure surface;

wherein the coupler includes a sheet of resilient material, the sheet defining a notch configured to receive a portion of the coupler with two portions of the sheet being disposed on opposite sides of the portion of the coupler, one of the two portions of the sheet being configured to urge the coupler in a first direction, another of the two portions of the sheet being configured to urge the coupler in a second direction that is opposite the first direction.

* * * * *